United States Patent [19]
Policelli

[11] Patent Number: 5,768,847
[45] Date of Patent: Jun. 23, 1998

[54] CONCRETE REINFORCING DEVICES, CONCRETE REINFORCED STRUCTURES, AND METHOD OF AND APPARATUS FOR PRODUCING SUCH DEVICES AND STRUCTURES

[76] Inventor: Frederick J. Policelli, 4891 Wallace La., Salt Lake City, Utah 84117

[21] Appl. No.: 441,386

[22] Filed: May 15, 1995

[51] Int. Cl.$^6$ ...................................................... E04C 3/34
[52] U.S. Cl. ..................... 52/649.1; 52/223.14; 52/600; 52/649.2; 52/730.2; 52/740.1; 52/DIG. 7; 156/172; 156/173; 156/175; 264/103; 428/36.3; 428/902
[58] Field of Search ............................... 52/223.1, 223.8, 52/223.14, 649.1, 649.2, 649.3, 651.11, 720.1, 730.1, 730.2, 731.1, 731.2, 732.1, 740.1, 740.8, 740.9, DIG. 7, 600, 721.1, 724.1; 428/36.3, 902; 156/172, 173, 175; 264/103

[56] References Cited

U.S. PATENT DOCUMENTS

| | | | |
|---|---|---|---|
| 60,713 | 1/1867 | Gates | 474/237 |
| 1,001,462 | 8/1911 | Scott | 52/649.1 X |
| 1,538,293 | 5/1925 | Loyeau | 52/649.2 X |
| 2,239,635 | 4/1941 | Walton, Jr. | 156/173 X |
| 2,425,883 | 8/1947 | Jackson | 52/740.8 X |
| 3,003,290 | 10/1961 | Lerner | 52/730.2 X |
| 3,111,569 | 11/1963 | Rubenstein | 52/223.14 |
| 3,441,468 | 4/1969 | Siggel et al. | 264/103 X |
| 3,460,628 | 8/1969 | Tankersley | 156/169 X |
| 3,533,203 | 10/1970 | Fischer et al. | 52/223.14 |
| 3,813,098 | 5/1974 | Fischer et al. | 52/223.14 X |
| 3,852,930 | 12/1974 | Naaman | 52/740.9 X |
| 3,871,149 | 3/1975 | Georgii | 52/649.3 X |
| 4,254,599 | 3/1981 | Maistre | 52/649.1 X |
| 4,286,429 | 9/1981 | Lin | 264/103 X |
| 4,366,658 | 1/1983 | Maistre | 428/36.3 X |
| 4,528,223 | 7/1985 | Kumazawa et al. | 428/902 X |
| 4,706,430 | 11/1987 | Sugita et al. | 52/649.1 X |
| 4,946,721 | 8/1990 | Kindervater et al. | 428/902 X |
| 5,071,687 | 12/1991 | Shigetoh | 428/902 X |
| 5,097,646 | 3/1992 | Lamle | 52/740.8 X |
| 5,202,070 | 4/1993 | Schneider | 264/103 |
| 5,250,132 | 10/1993 | Lapp et al. | 156/173 |
| 5,312,660 | 5/1994 | Morris et al. | 428/902 X |
| 5,409,651 | 4/1995 | Head | 264/103 |

FOREIGN PATENT DOCUMENTS

| | | | |
|---|---|---|---|
| 671062 | 7/1989 | Switzerland | 52/740.9 |
| 781294 | 11/1980 | U.S.S.R. | 52/740.8 |

Primary Examiner—Carl D. Friedman
Assistant Examiner—Kevin D. Wilkens
Attorney, Agent, or Firm—Mallinckrodt & Mallinckrodt

[57] ABSTRACT

Concrete structures, such as beams, columns, decks, walls, and the like are reinforced by advanced fibrous composite, concrete reinforcing devices, embedded in concrete, the devices comprising, respectively, at least one continuous band of tow, yarn, or strand of high strength, high modulus, fibrous laminate material having a multitude of very fine structural filaments as laminae bonded together in endless belt formation, such band or bands forming a bar of endless belt formation having at least two length portions extending longitudinally in substantially coextensive spaced relationship as load-bearing tendons, with end portions continuing around opposite ends of the device in unbroken continuity. The tendons of the bar may be either straight or deflected and may be pre-tensioned or post-tensioned. A band may be interlaced as a continuous perimeter, mesh shell. The invention includes both method and apparatus for making the device in its various forms and reinforced concrete structures wherein the concrete reinforcing devices are anchored externally of the surfaces of precast concrete structures to become tension systems of such structures.

7 Claims, 3 Drawing Sheets

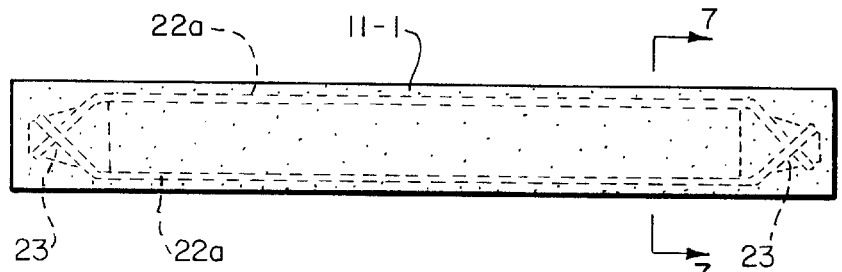
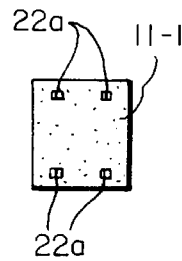
FIG. 6  FIG. 7
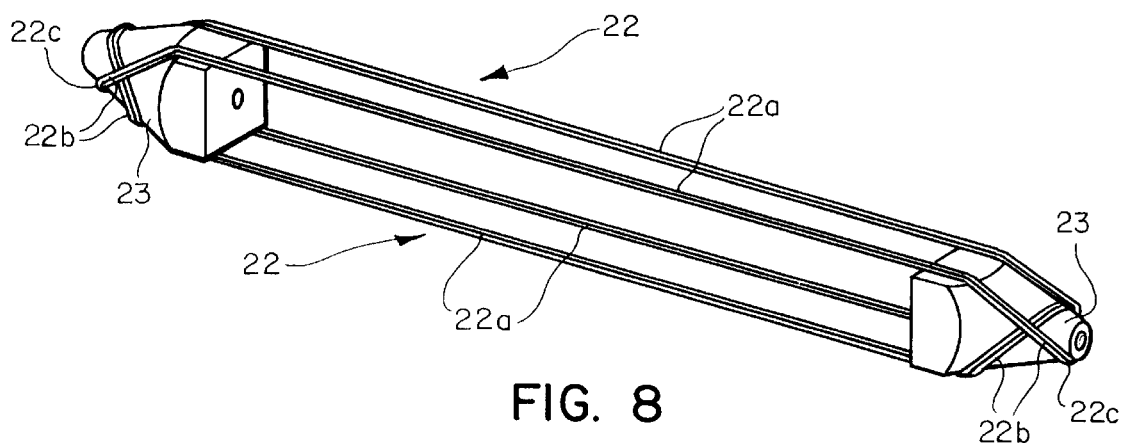
FIG. 8
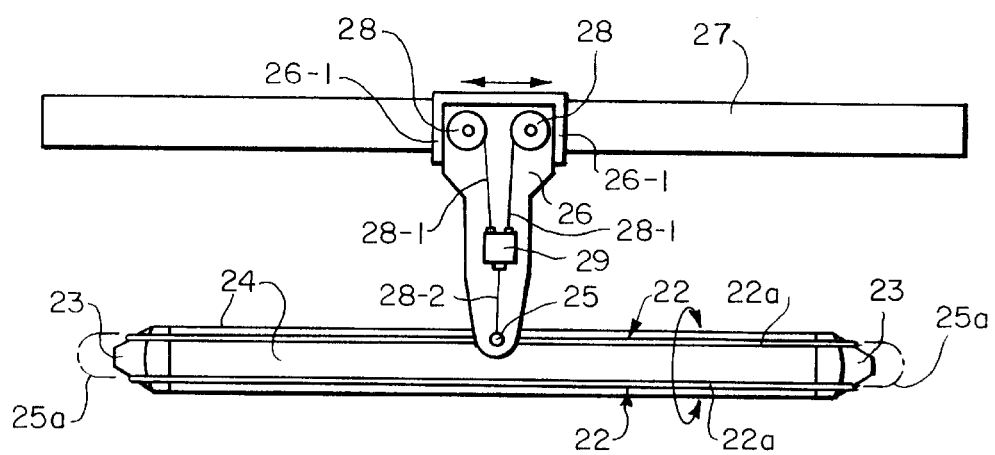
FIG. 9

CONCRETE REINFORCING DEVICES, CONCRETE REINFORCED STRUCTURES, AND METHOD OF AND APPARATUS FOR PRODUCING SUCH DEVICES AND STRUCTURES

BACKGROUND OF THE INVENTION

1. Field

The invention is in the field of reinforced concrete construction and of reinforced concrete structures, such as beams, columns, decks, walls and like structures.

2. State of the Art

Concrete structures have long been reinforced with steel bars, commonly referred to as "rebar", or with wire mesh. Such reinforcements present problems in structures, such as concrete bridges, that are exposed to the weather. The extensive use of deicing chemicals and the existence of both natural and man-made corrosive environments are drastically reducing the service life of these structures by reason of corrosion of the steel reinforcement, which progressively promotes debonding and spalling of the concrete and seriously reduces structural strength of the facility. Newer designs of concrete structures and coating of steel bars with various materials, such as rubber or epoxy, to prevent such corrosion have not solved the problem.

Composite structural materials are well-known. These are made up of large numbers of very fine structural filaments, such as glass, carbon, or a material known as "aramid", which have been bound together as, in effect, laminae of a continuous band by application thereto of a settable liquid bonding material, such as an epoxy, in a manner well-known in the production of what have become known as "advanced composites" and which are beginning to be used in civil engineering structures. Such material has been utilized successfully in some forms of concrete reinforcing devices for special applications in water treatment plants, chemical processing plants, and marine installations, but there are wider fields of use that have only begun to be considered, as in the reinforcing of concrete in highway bridges, railway bridges, commercial buildings, etc.

In addition to having desirable strength properties, concrete reinforcing devices must have reliable means for anchorage to the concrete. The anchorages must be such that high loads can be effectively transferred from the concrete to the reinforcement. To be fully effective, the anchorages must perform continuously and cyclically over long periods of time, without loss of strength and without imposing significant degradation to either the concrete or the reinforcement.

Prior art proposals for use of such advanced composites in concrete reinforcing devices are limited by low anchorage strength. For example, owing to incorporation of mechanical anchorages, such as wedges and clamps, at terminations of single, straight bar tendons, and to the behavior of these mechanical devices as so incorporated, the result is low efficiency, particularly under cyclic tension loading. There are high interlaminar and bond shear stresses within the structural filament laminates and at the surfaces thereof, which adversely affect such mechanical anchorages.

Elongate structural filaments associated together longitudinally as a starting material are usually spoken of in the art concerned as a "fiber bundle". Such bundle may be a "tow", or, if a "single" tow is twisted, a "yarn", or, if two or more yarns are twisted together, a "strand".

SUMMARY OF THE INVENTION

Concrete reinforcing devices concerned in this invention are of an advanced composite material in elongate form for use in reinforcing various structural shapes, such as beams, columns, struts, etc., and constitute at least one bar comprising at least one continuous band of endless belt formation and made up of one or more fiber bundles of tow or tows, of yarn or yarns, or of strand or strands of very fine reinforcing filaments. In the various embodiments of such device, each bar extends longitudinally of the device in one way or another and around opposite ends of the device in preferably arcuate formation. Each bar has at least two preferably straight band length portions and doubles back on itself so that the band length portions extend and are spaced apart as load-bearing tendons between opposite end portions of the device. The end portions are continuations of the band length portions, whereby the reinforcing filaments continue from one length portion around the end portions of the device to the other of the band length portions in endless belt formation. The reinforcing structural device is open between the band length portions of the bar for the reception of concrete. A settable material, such as a resin, surrounds and bonds the plurality of filaments along the band length portions and around the band end portions of the bar.

In one form, the bar band length portions comprise two, spaced apart, preferably straight, longitudinal tendons having opposite end portions formed around respective structural fid members to provide a concrete reinforcing device that can be used for pre-tensioning or for post-tensioning purposes, or that has such opposite end portions merely turned around the bar ends. In both instances, whether or not fid members are present, the opposite end portions desirably form respective arcs and provide anchorages at the looped ends of the bar.

Another version of the device comprises at least one bar having preferably straight tendon lengths with opposite ends deflected and wrapped around surfaces of respective conical fid members.

In another embodiment, the device is formed as a single bar constituting an endless belt of three-dimensional, mesh formation, the continuous band of such endless belt being interwoven longitudinally as a mesh shell. The mesh shell, which may be of various shapes in transverse cross section, provides nodes at the locations at which portions of the band cross and overlap other portions of the band. These overlaps or interlocking nodes provide effective anchorages for the reinforcement of the concrete.

THE DRAWINGS

The best modes presently contemplated for carrying out the invention are, illustrated in the accompanying drawings in which:

FIG. 1 represents a longitudinal side elevation of a structurally reinforced concrete beam, showing by broken lines a concrete reinforcing device of advanced fibrous composite material provided at its ends with fid members and embedded in concrete interiorly of the beam;

FIG. 2 a transverse vertical section taken on the line 2—2 of FIG. 1;

FIG. 3 a pictorial view looking down on the top of the concrete reinforcing device of FIG. 1 prior to its being incorporated in the concrete beam of FIGS. 1 and 2;

FIG. 4 a fragmentary, longitudinal, vertical section taken on the line 4—4 of FIG. 3, after attachment means for customary pre-tensioning or post-tensioning apparatus has been attached to the fid member;

FIG. 5 a schematic front elevational view of apparatus for carrying out the method of producing the reinforcing device of FIG. 3, the path of travel of the band delivery eye being indicated by a broken line;

FIG. 6 a view corresponding to that of FIG. 1 but showing a reinforced concrete beam incorporating a different form of the reinforcing device;

FIG. 7 a view corresponding to that of FIG. 2 but taken on the line 7—7 of FIG. 6;

FIG. 8 a view corresponding to that of FIG. 3, but of the reinforcing device of FIG. 6;

FIG. 9 a view corresponding to that of FIG. 5, but of apparatus for carrying out the method of producing the device of FIG. 8;

FIG. 10 a view corresponding to those of FIGS. 1 and 6 but illustrating a concrete beam reinforced by another embodiment of the reinforcing device in which the bar is a unitary mesh shell having the band interwoven and overlapped to form anchoring nodes;

FIG. 11 a view corresponding to those of FIGS. 2 and 7 but taken on the line 11—11 of FIG. 10;

FIG. 12 a view corresponding to those of FIGS. 3 and 8 but showing the interwoven mesh shell embodiment of reinforcing device shown in FIG. 10;

FIG. 13 a fragmentary side elevation of the right-hand end of the mesh shell embodiment of FIG. 12 drawn to a somewhat larger scale; and FIG. 14 a view corresponding to those of FIGS. 5 and 9, but showing the apparatus for carrying out the method used to produce the mesh shell embodiment of FIG. 12.

DETAILED DESCRIPTION OF THE ILLUSTRATED EMBODIMENTS

Figure 1:
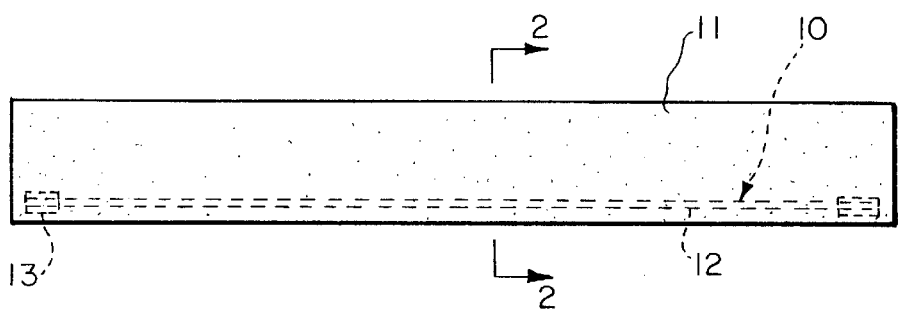
Figure 2:
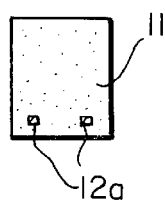
Figure 3:
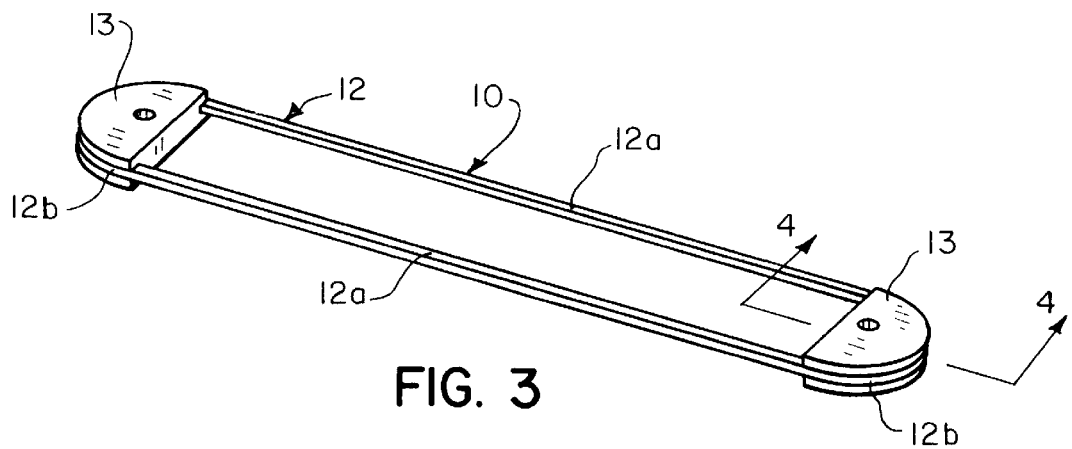

As illustrated in FIGS. 1 and 2, a bar 10 as the advanced composite, concrete reinforcing device, see FIG. 3, is embedded in concrete 11 to provide a pair of coextensive length portions 12a of an endless band 12 as longitudinal tendons spaced apart along their lengths to receive the concrete 11 as a wet mix prior to its setting as the final reinforced concrete beam of FIGS. 1 and 2. The respective opposite end portions 12b of band 12 are shown as wrapped around arcuate receiving grooves 13a, respectively, of fid members 13, which may or may not be present depending upon whether there is to be pre-tensioning or post-tensioning. Whether present or not, the length members 12a of the band 12 are preferably straight, as shown, and continue arcuately around the ends of the device in unbroken continuity.

Band 12 is formed as an endless, elongate belt of a high strength, high modulus, advanced fibrous composite. Very fine structural filaments of glass, graphite, aramid, or other material normally used in the production of such composites are bonded together by a set liquid material, such as a resin.

Figure 4:
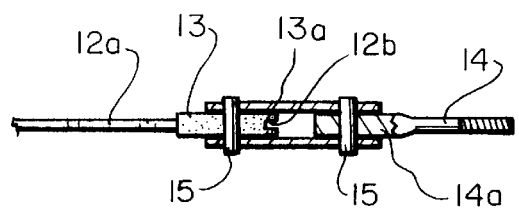

For pre-tensioning or post-tensioning purposes, the fid members 13 may be provided, as shown in FIG. 4, with attachment means, such as a threaded shank 14, that is usually pivotally secured, as by respective pins 15, to fid member 13 and shank head 14a, for attachment of customary pre-tensioning or post-tensioning apparatus.

Figure 5:
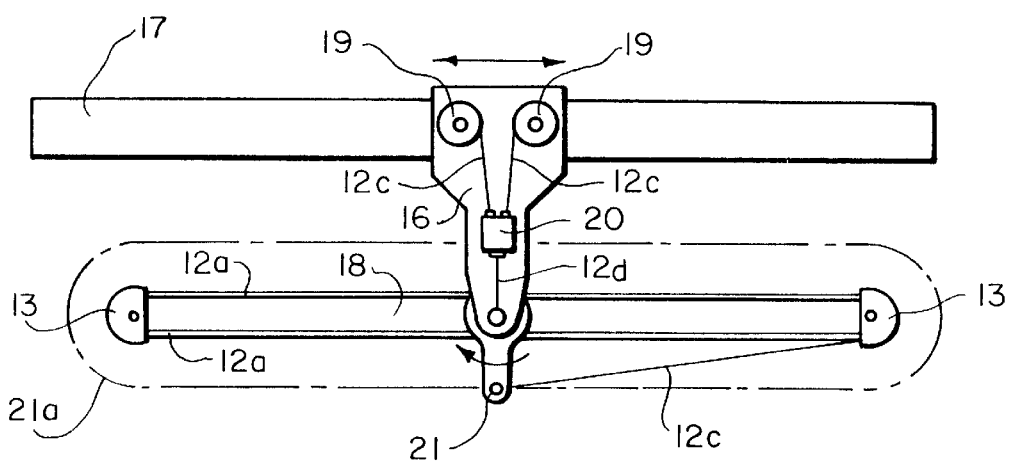
Figure 10:
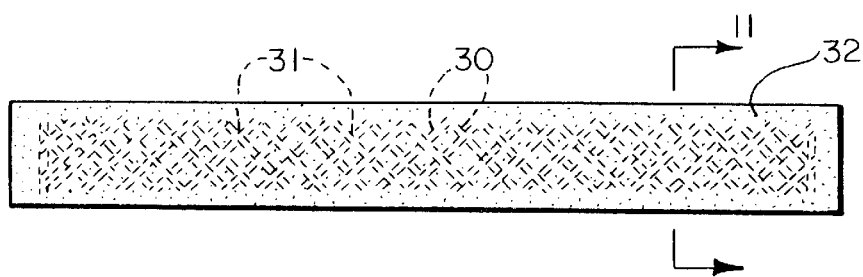
Figure 11:
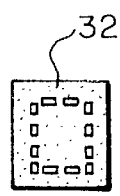

Band 12 may be a single, elongate and endless belt that provides loop ends for bar 10, as shown, or there may be sets of bands 12 (not shown), superimposed or arranged side-by-side, as laid down by the apparatus of FIG. 5.

In the apparatus of FIG. 5, a carriage 16 is slidably mounted on an elongate track 17 for reciprocation, by powered mechanism (not shown), longitudinally of an elongate, center, form piece 18 removably carrying half-circle form pieces (which may be the fid members 13) at its opposite ends, respectively. Filament tows, yarns, or strands 12c to be consolidated into a band 12 are fed continuously from respective reels 19 through a bonding resin applicator 20 to a band delivery eye 21 rotatably mounted at the lower end of carriage 16 for travelling a path 21a along the center form piece 18 and about the end form pieces, here the fid members 13, to lay down preferably straight band length portions 12a, FIG. 3, and arcuate band end portions 12b.

This embodiment of the device comprises preferably straight tendon length portions 12a continuing around half-circle arcs as end portions 12b, with semi-circular fids 13 at opposite ends of the device for the purpose, if constructed for example as in FIG. 4, of inducing a pre-tensioning or a post-tensioning load on the tendons 12a. Longitudinal loads, comprising induced loads and tendon loads resulting from static and dynamic loading of a concrete structure that incorporates such a bar device as reinforcement for the concrete, are active at the respective half-circle contact surfaces between the tendon members 12a and the semi-circular fids 13 and between other surfaces of the semi-circular fids and the cast concrete 11. For concrete reinforcing that does not use induced loads, the semi-circular fids are not necessary. Without them, the load interaction occurs directly between the arcuate end portions 12b and the cast concrete 11.

The longitudinal interaction load between a tendon and the concrete in this unique endless belt anchorage of the device to the concrete is in the form of a radial bearing, which becomes a compressive stress in the tendon portion and is preferred over other forms of loading that result in interlaminar stresses. The reaction of this radial bearing becomes likewise a compressive stress in the fid member and the concrete. This is a desirable type of stress for concrete.

In using the devices embedded in concrete, the unique tendon and anchorage system becomes the principal tension system of the concrete structure. Alternatively, this tendon and anchorage arrangement can be used as assembled and anchored externally to the surface of precast concrete elements to become a tension system of the structure.

The method of making the tendon bar device comprises utilizing the filament bundle winding reels 19 of the apparatus of FIG. 5 to provide fibrous, laminate tows, yarns, or strands 12c; passing such tows, yarns, or strands through a settable liquid, such as a resin, to form a continuous band 12d; laying down the continuous band 12d about form means typically having a straight center piece 18 and arcuate ends in the form of fids 13, by means of a delivery eye 21, which is moved in an oval path around the form means as held stationary; setting the bonding liquid; and finally removing at least the center form piece 18. By this method, a very large number of continuous filaments are brought together rapidly to form the endless band member 12 having substantially coextensive length portions 12a and conforming to a preferably straight oval, endless belt-like shape.

Many types of filaments can be used, as well as many types of settable liquid materials, including thermoset resins, such as epoxy and polyester, and thermoplastic resins.

In FIGS. 6 through 9, a deflected or angled tendon system is schematically illustrated. This is a variant of the first tendon system. It can comprise one, or as shown, a plurality of deflected or angled bands 22 of endless belt formation, each with preferably straight length portions 22a, FIG. 8, and deflected portions 22b at opposite ends and continuing with end portions 22c around the bar ends on arcs, all such portions of a bar being made together as a single continuous band of endless belt formation. The final device as here shown has a three-dimensional, shell-like shape with canted ends and, typically, with conical fid members 23 at opposite looped ends of the bar. Such looped ends of the bar are for the purpose of anchoring. The conical fid members 23 at the ends of the deflected or angled bars may be used to induce pre-tensioning or post-tensioning loads in the tendons.

Post-tensioning of a deflected tendon can be performed with semi-circular fid members external to the concrete if the tendon end portions are extended beyond the concrete 11-1 that is cast into the space between the tendon length portions 22a.

The three-dimensional, shell-shaped devices may be made with many different cross sections, such as rectangular, triangular, circular, elliptical, etc.

By way of comparing the strength and weight attributes of such a shell-shaped device with currently used standard steel reinforcing bars, an example is given for the deflected tendon bar device of FIG. 8 that is square in transverse cross section and composed of graphite fibers and epoxy resin, which are the preferred materials. For equal axial stiffness, where axial stiffness is the product of area and axial modulus, a circular steel bar ten millimeters in diameter will have an ultimate strength of three metric tons and a weight of sixty-five hundredths of a kilogram per meter. The equivalent composite bar of the invention of equal stiffness will be ten millimeters on a side, with an ultimate strength of twenty-two metric tons and a weight of sixteen hundredths of a kilogram per meter. The cross section of the composite bar of this construction will typically contain over one and one-half million filaments.

The method of making a deflected or angled tendon bar device, such as that of FIGS. 6 through 8, involves the use of the apparatus of FIG. 9, which is generally similar to the apparatus illustrated in FIG. 5, but has a preferably straight, elongate, and rotatably mounted center form piece 24, here shown as square in transverse cross section, with conical end form pieces, e.g. fid members 23, at opposite ends. The fiber band delivery eye 25 moves with a carrier 26 therefor, which, with its mounting 26-1, is reciprocated on and along an elongate track 27 to lay down longitudinal tendon portions 22a of the band 22 of a bar reinforcing device 10 as form piece 24 of the apparatus remains stationary between partial rotations in opposite directions at opposite ends, respectively, of the reciprocative strokes of delivery eye 25, see the schematic showings at 25a, by known reciprocating means. Fiber tows, yarns, or strands 28-1 are fed from fiber bundles thereof on reels 28 through an applicator 29 holding a settable liquid to form a continuous band 28-2, which is fed into delivery eye 25.

By this method and apparatus, a very large number of continuous filaments are brought together rapidly and adhered together to form the continuous band 28-2 and the endless belt-like band member 22, FIG. 8, that is deflected or angled at its ends so as to provide the pairs of longitudinally, load-bearing tendons 22a. The two band members form a three-dimension shell about the perimeter of the device. The liquid bonding agent is subsequently hardened to bond and maintain the filaments in the desired configuration. Following hardening of the bonding agent, at least the longitudinal center form piece 24 is removed.

Another embodiment of the device is illustrated in FIGS. 10–14 as an interwoven, concrete reinforcing bar, formed in itself as a three-dimensional, open mesh shell. A band 30 of high strength, high modulus, advanced fibrous composite is interwoven and interlocked longitudinally and at opposite end portions to form tendon lengths of a mesh shell, which is of endless belt formation, and encloses an elongate, three-dimensional space in unbroken continuity. The mesh shell has a continuous perimeter of selectively directed and overlapped portions of the continuous, interlaced band 30.

Figure 12:
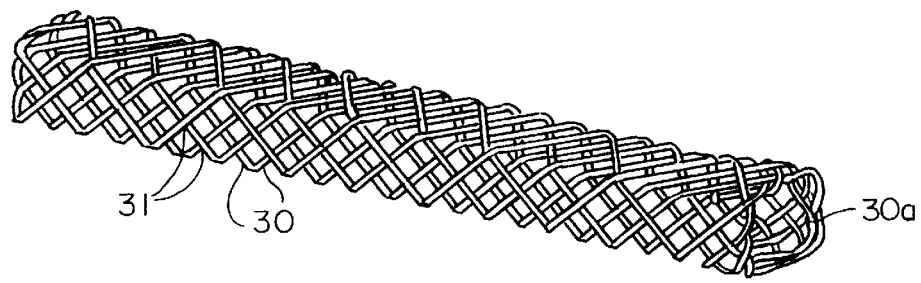
Figure 13:
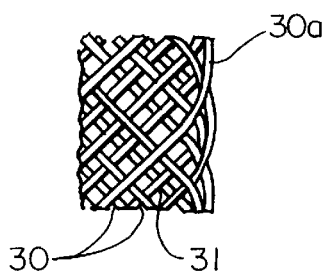

Overlapped portions of band 30 form nodes 31, which provide anchorages for the concrete 32 in a beam or other shape. At the ends, diagonal portions 30a of band 30 are curved to provide additional anchorage as well as tensile continuity at the open ends of the shell as shown in FIG. 12.

Angulation of the band 30 at and adjacent to the overlaps or nodes 31 can be selected to best suit principal tensile and compression stress directions contemplated as arising in the concrete structure when exposed to anticipate external loads, for example, an angle set of +/−45° for shear stresses common to beams; an angle set of +/−85° for circumferential stresses in columns; an angle set of +/−10° for tensile and compression stresses in most all types of beams and slabs; and combinations of more than one band angle for combined shear, tension, and compression in concrete structure having complex loads. The multiple surfaces formed at each node provide high strength connections which can resist high interaction loads between the reinforcement and the concrete.

Comparing the strength attributes of such a shell mesh bar, that is interwoven and interlocked around its perimeter to form an advanced composite reinforcing device rectangular in right cross section as made up of graphite fibers and epoxy resin, with those of currently used steel reinforcing bars for equal stiffness, where stiffness is the product of area and modulus, a cylindrical steel bar of five millimeters diameter will have an ultimate strength of seven-tenths of a metric ton and a weight of sixteen-hundredths of a kilogram per meter, while the equivalent advanced composite mesh shell bar device of the invention will be, for example, three millimeters by nine millimeters in right cross section with an ultimate strength of five and one-half metric tons and a weight of four-hundredths of a kilogram per meter. The cross section of the composite bar will typically contain over three hundred eighty thousand filaments.

Figure 14:
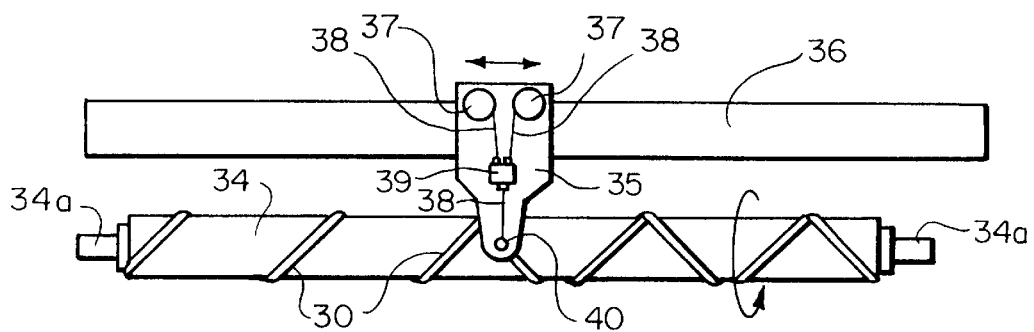

In producing the device of FIGS. 10–13, the method and apparatus shown in general and schematically by FIG. 14 utilizes an elongate mandrel 34, rotatably mounted by short shaft ends 34a, and a carriage 35 mounted for reciprocation on and along an elongate track 36. Carriage 35 carries reels 37 for feeding filament tows, yarns, or strands 38 of the advanced fibrous composite material in fiber bundles wound on such reels through bonding resin applicator 39, from where the resulting band 30 passes through fiber delivery eye 40 onto the surface of rotating mandrel 34 as shown.

By this version of the method and apparatus of the invention, many different shell shapes can be made, for example, shells having cross sections that are triangular, rectangular, or otherwise polygonal, or circular, or elliptical, and longitudinally cylindrical, pyramidal, conical, or oblate, and combinations of these. It is best, however, that the cross section of the bar mesh shell shall be substantially rectangular to provide for the most effective overlapping at the nodes 31.

A large range of sizes is practical for devices of the invention. Cross sections may be a few square centimeters to as large as ten square meters and with lengths up to in excess of eighty meters. Many types of fibers can be used, including carbon, glass, and aramid, and many types of liquid bonding materials can be used, including thermoset and thermoplastic resins.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A reinforced concrete structure, comprising an advanced fibrous composite, concrete reinforcing device embedded in concrete and being of high strength, high modulus, fibrous material having a multitude of structural filaments bound together as laminae by a settable bonding material, said device comprising at least one elongate bar made up of at least one band of endless belt formation from said fibrous material, said at least one bar having band length portions extending longitudinally as load-bearing tendons along and defining a substantially correspondingly elongate, internal space substantially filled with concrete and having band end portions extending about opposite ends of the concrete-filled space in unbroken continuity with said band length portions.

2. A reinforced concrete structure, according to claim 1, wherein each bar of the concrete reinforcing device comprises a pair of straight length portions serving as the longitudinal tendons.

3. A reinforced concrete structure according to claim 2, wherein there are fid members at opposite ends, respectively, of the concrete reinforcing device, said fid members having arcuate surfaces for receiving opposite band end portions; and wherein said band end portions are wrapped around the arcuate surfaces of said fid members.

4. A reinforced concrete structure according to claim 1, the concrete reinforcing device comprising at least two pairs of the band length portions and of the band end portions defining as a shell a three-dimensional, elongate space substantially filled with concrete.

5. A reinforced concrete structure according to claim 4, wherein there are conically formed fid members at opposite ends of the device, respectively, having arcuate surfaces receiving end portions of the band or bands which are wrapped around said arcuate surfaces, respectively.

6. A reinforced concrete structure, according to claim 1, wherein the continuous band or bands of the concrete reinforcing device are interwoven longitudinally and at opposite ends of the at least one bar as a three-dimensional, mesh shell of continuous band formation substantially filled with concrete, the fibrous material of the band or bands being overlapped as anchorage nodes.

7. A reinforced concrete structure according to claim 1, wherein there are substantially semicircular fids at opposite ends of the concrete reinforcing device, about which are wrapped the end portions of the band or bands of the elongate bar or bars.

* * * * *